United States Patent [19]

Hiraiwa

[11] Patent Number: 4,638,688
[45] Date of Patent: Jan. 27, 1987

[54] PLANETARY GEAR TRAIN FOR AUTOMOTIVE TRANSMISSION OR THE LIKE

[75] Inventor: Kazuyoshi Hiraiwa, Atsugi, Japan

[73] Assignee: Nissan Motor Co., Ltd., Yokohama, Japan

[21] Appl. No.: 595,533

[22] Filed: Mar. 30, 1984

[30] Foreign Application Priority Data

Apr. 4, 1983 [JP] Japan .................................. 58-57830
Apr. 4, 1983 [JP] Japan .................................. 58-57831

[51] Int. Cl.$^4$ .............................................. F16H 57/10
[52] U.S. Cl. ........................................ 74/763; 74/753
[58] Field of Search ................ 74/763, 753, 758, 759, 74/762

[56] References Cited

U.S. PATENT DOCUMENTS

| | | | |
|---|---|---|---|
| 2,546,378 | 3/1951 | Winther | 74/759 |
| 3,483,771 | 12/1969 | Forster et al. | 74/763 |
| 3,812,739 | 5/1974 | Mori et al. | 74/763 |
| 3,817,124 | 6/1974 | Mori et al. | 74/759 |
| 3,823,622 | 7/1974 | Mori et al. | 74/759 |
| 3,971,268 | 7/1976 | Murakami et al. | 74/753 |
| 3,999,448 | 12/1976 | Murakami et al. | 74/753 |
| 4,027,551 | 6/1977 | Murakami et al. | 74/753 |
| 4,027,552 | 6/1977 | Murakami et al. | 74/753 |
| 4,086,827 | 5/1978 | Chans | 74/759 |
| 4,089,239 | 5/1978 | Murakami | 74/753 |
| 4,224,838 | 9/1980 | Roushdy et al. | 74/763 |
| 4,242,924 | 1/1981 | Melhorn et al. | 74/763 |
| 4,331,044 | 5/1982 | Bookout et al. | 74/762 |

FOREIGN PATENT DOCUMENTS 2065397 8/1973 Fed. Rep. of Germany ........ 74/759
0009348 1/1982 Japan .................................. 74/763

OTHER PUBLICATIONS

1982 Corvette Shop Manual, 700–R4 Automatic Transmission.
European Search Report.

Primary Examiner—Leslie A. Braun
Assistant Examiner—David Novais
Attorney, Agent, or Firm—Schwartz, Jeffery, Schwaab, Mack, Blumenthal & Evans

[57] ABSTRACT

A planetary gear train is arranged to include two planetary gear sets, four clutches and two brakes and to input rotational energy (engine torque) through a relatively large diameter element (in low gears) until a relatively high gear is reached whereafter the input is made through one or both of a smaller diameter element and the previously mentioned larger one. This arrangement inherently avoids energy wasting closed loop transmission paths from being established between the two gear sets.

6 Claims, 18 Drawing Figures

|  |  | C1 | C2 | C3 | C4 | B1 | B2 | OWC2 | OWC2 |
|---|---|---|---|---|---|---|---|---|---|
| D RANGE | FIRST SPEED |  |  | ○ |  |  |  | ○ | ○ |
|  | SECOND SPEED |  |  | ○ |  | ○ |  | ○ |  |
|  | THIRD SPEED |  |  | ○ | ○ |  |  | ○ |  |
|  | FOURTH SPEED |  |  |  | ○ | ○ |  |  |  |
| LOW RANGE | FIRST SPEED | ○ |  |  |  |  | ○ |  |  |
|  | SECOND SPEED | ○ |  |  |  | ○ |  |  |  |
| R | REVERSE |  | ○ |  |  |  | ○ |  |  |

| | C1 | C2 | C3 | C4 | B1 | B2 | GEAR RATIO | $\alpha_1 = 0.48$<br>$\alpha_2 = 0.36$ |
|---|---|---|---|---|---|---|---|---|
| FIRST SPEED | | ◯ | ◯ | | | ◯ | $1 + \alpha_1 + \alpha_1/\alpha_2$ | 2.813 |
| SECOND SPEED | | ◯ | ◯ | | ◯ | | $1 + \alpha_1$ | 1.480 |
| THIRD SPEED | | ◯ | | | ◯ | | 1 | 1.000 |
| FOURTH SPEED | | | | ◯ | ◯ | | $1/(1+\alpha_2)$ | 0.735 |
| REVERSE | ◯ | | ◯ | | | ◯ | $-1/\alpha_2$ | -2.778 |

| | C1 | C2 | C3 | C4 | B1 | B2 | OWC1 | GEAR RATIO | $\alpha_1 = 0.48$<br>$\alpha_2 = 0.36$ |
|---|---|---|---|---|---|---|---|---|---|
| FIRST SPEED | | ○ | ○ | | | | ○ | $1 + \alpha_1 + \alpha_1/\alpha_2$ | 2.813 |
| SECOND SPEED | | ○ | ○ | | | ○ | | $1 + \alpha_1$ | 1.480 |
| THIRD SPEED | ○ | ○ | | | | | | 1 | 1.000 |
| FOURTH SPEED | ○ | | | | ○ | | ○ | $1/(1 + \alpha_2)$ | 0.735 |
| REVERSE | | | | ○ | | ○ | | $-1/\alpha_2$ | −2.778 |

| | C1 | C2 | C3 | C4 | B1 | B2 | OWC 1 | OWC 2 | OWC 3 |
|---|---|---|---|---|---|---|---|---|---|
| D RANGE FIRST SPEED | ◯ | ◯ | | | | | ◯ | | |
| D RANGE SECOND SPEED | ◯ | ◯ | | | ◯ | | | ◯ | |
| D RANGE THIRD SPEED | | ◯ | (◯) | | (◯) | | | ◯ | |
| D RANGE FOURTH SPEED | | | ◯ | ◯ | ◯ | | | | ◯ |
| LOW RANGE FIRST SPEED | | ◯ | ◯ | | | ◯ | | | |
| LOW RANGE SECOND SPEED | | ◯ | ◯ | | ◯ | | | | |
| R REVERSE | ◯ | | ◯ | | | ◯ | | | |

|  |  | C 1 | C 2 | C 3 | C 4 | B 1 | B 2 | OWC 1 | OWC 2 |
|---|---|---|---|---|---|---|---|---|---|
| D RANGE | FIRST SPEED |  | ○ | ○ |  |  |  |  | ○ |
|  | SECOND SPEED |  | ○ | ○ |  | ○ |  |  |  |
|  | THIRD SPEED | ○ | ○ |  |  |  |  |  |  |
|  | FOURTH SPEED | ○ |  |  |  | ○ |  | ○ |  |
| LOW RANGE | FIRST SPEED |  | ○ | ○ |  |  | ○ |  |  |
|  | SECOND SPEED |  | ○ | ○ |  | ○ |  |  |  |
| R | REVERSE |  |  |  | ○ |  | ○ |  |  |

PLANETARY GEAR TRAIN FOR AUTOMOTIVE TRANSMISSION OR THE LIKE

BACKGROUND OF THE INVENTION

1. Field of the Invention

The present invention relates generally to an automotive transmission and more specifically to a planetary gear transmission which increases both the longevity and the efficiency of same.

2. Description of the Prior Art

Figure 1:
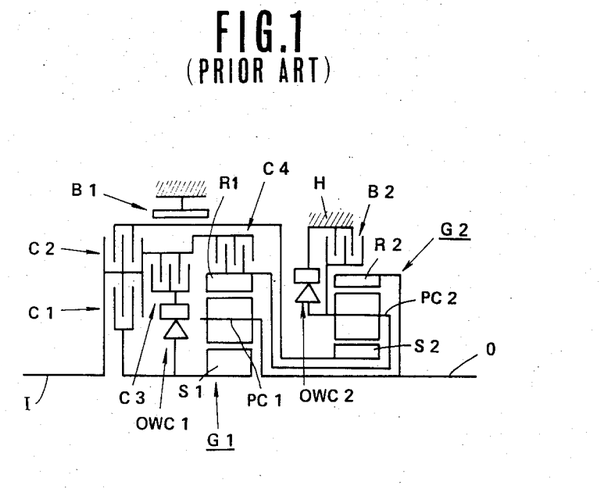
FIG. 1 is a schematic diagram of the prior art transmission gear train discussed briefly in the opening paragraphs of the present invention.
Figure 2:
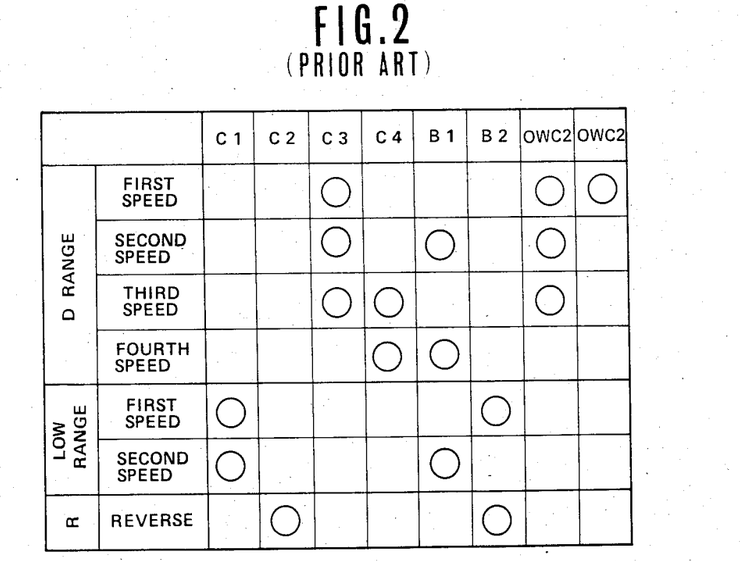
FIG. 2 is a table showing the engagement of the various friction elements which produce the various speeds or gears of the FIG. 1 transmission.

FIG. 1 of the drawings schematically shows a previously proposed planetary gear transmission. This arrangement includes sun gears S1 and S2, ring gears R1 and R2 and pinion carriers PC1 and PC2 on which pinion gears are mounted connected, as shown with the input shaft I, output shaft O, first-fourth clutches (C1, C2, C3 and C4), two brakes (B1 and B2) and two one-way clutches OWC1 and OWC2. With this arrangement the clutches and brakes are selectively applied as shown in the table of FIG. 2 to produce four forward speeds and one reverse.

However, with the above described arrangement the engine torque is applied via input shaft I to the sun gear S1 by way of clutch C3 and one-way clutches OWC1 and OWC2 in first second and third speeds and to sun gear S2 through clutch C3 in reverse. This induces the problem that, as the diameter of the sun gears S1 and S2 are relatively small, a relatively large stress is applied to the teeth thereof, thus inducing a limit to which torque can be safely applied. Further, as the sun gear S1 tends to rotate at a speed approximately 2.5 times that of the input shaft during fourth speed a further problem is encountered in that, due to the prolonged high rotational speeds to which the element is subjected, the structural strength of the components associated with the sun gears along with the durability of the bearings which support same must be given particular attention to avoid rapid deterioration of the transmission as a whole. Moreover, the arrangement of this gear train is such as to permit a closed loop transmission path to be established between the two planetary gear sets inducing both mechanical inefficiency and unnecessary wear of the two planetary gear units.

SUMMARY OF THE INVENTION

It is an object of the present invention to provide a planetary gear train which avoids normally applying engine torque to a single relatively small diameter element of a planetary gear train, inducing excessively high rotational speeds thereof and to additionally avoid mechanical inefficiency within the gear train per se.

In brief, the above object is fullfilled by a planetary gear train which includes two planetary gear sets, four clutches and two brakes and which is arranged to input rotational energy (engine torque) through a relatively large diameter element (in low gears) until a relatively high gear is reached whereafter the input is made through one of both of a smaller diameter element and the previously mentioned larger one. This arrangement inherently avoids energy wasting closed looped transmission paths from being established between the two gear sets.

More specfically, the present invention takes the form of a planetary gear train comprising: an input shaft operatively connected with a source of rotational energy, first and second planetary gear sets respectively including first and second sun gears, first and second ring gears, first and second pinion carriers and first and second sets of pinion gears operatively mounted on the first and second pinion carriers and respectively arranged to mesh with their respective sun and ring gears, a first clutch for selectively providing a drive connection between the input shaft and the first sun gear, a second clutch for selectively providing a drive connection between the input shaft and the first ring gear, a third clutch for selectively providing a drive connection between first and second sun gears, a fourth clutch for selectively providing a drive connection between the first sun gear and the second pinion carrier, a first brake for selectively rendering the second sun gear stationary with respect to a housing in which the transmission is disposed, a second brake for selectively rendering the second pinion carrier stationary with respect to the housing, and an output shaft in drive connection with the first pinion carrier and the second ring gear.

BRIEF DESCRIPTION OF THE DRAWINGS

The features and advantages of the arrangement of the present invention will become more clearly appreciated from the following description taken in conjunction with the accompanying drawings in which:

FIGS. 12 to 15 show third to sixth embodiments of the present invention respectively;

DETAILED DESCRIPTION OF THE PREFERRED EMBODIMENTS

Figure 3:
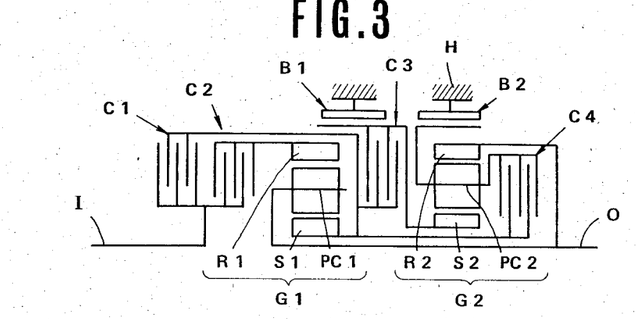
FIG. 3 is a schematic diagram illustrating a first embodiment of the present invention.

FIG. 3 shows a first embodiment of the present invention. This gear train includes first and second planetary gear sets G1 and G2, an input shaft I, first to fourth clutches, C1, C2, C3, and C4 and first and second brakes B1 and B2. The first planetary gear set G1 includes a sun gear S1, a first pinion carrier PC1 which supports pinion gears which constantly mesh which the sun gear S1, and a ring gear R1. The second planetary gear set G2 similarly includes a sun gear S2, a pinion carrier PC2 on which pinion gears are mounted and a ring gear R2.

As shown, the input shaft I and the first sun gear S1 are selectively engageable to produce a drive connection therebetween by the first clutch C1 while the ring gear R1 of the same planetary gear set is selectively engageable with the input shaft I through the second clutch C2. The pinion carrier PC1 is arranged to be constantly connected to the output shaft O as is the ring gear R2 of the second planetary gear set. The sun gear S2 of the second planetary gear set G2 is arranged to be selectively connectable with the sun gear S1 via clutch C3 or to be connected to the transmission housing H (viz., rendered stationary) by the first brake B1. The pinion carrier PC2 of the second planetary gear set G2 is arranged to be selectively connectable with the sun gear S1 through the fourth clutch C4 and with the transmission housing via the second brake B2.

Figure 4:
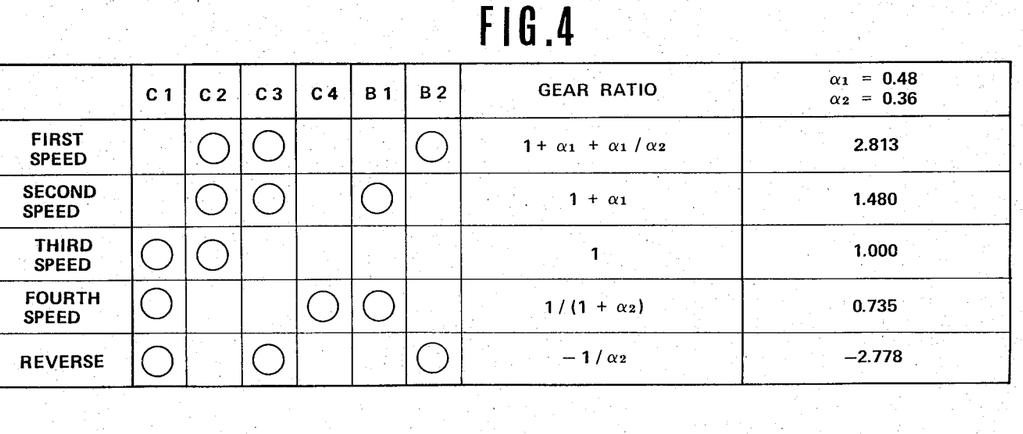
FIG. 4 is a table setting forth the various friction elements incorporated in the FIG. 3 gear train which must be engaged for the various gear ratios.

Selective engagement and disengagement of the above mentioned clutches and brakes as shown in the table of FIG. 4, enables the production of four forward speeds and one reverse. In FIG. 4 the symbols "$\alpha_1$" and "$\alpha_2$" respectively indicate the ratio of the number of teeth on the ring gears R1 and R2 to those on the sun gears S1 and S2. As will be readily appreciated the operations involving first, second, third and reverse gears of the first embodiment are fundamentally the same as the well known "Simpson" gear train; clutch C2 corresponding to the foward clutch (F/C), clutch C1 to the high and reverse clutch (H and R/C), brake B2 to the low and reverse clutch (L and R/C) and brake B1 to the intermediate band brake.

Further, as will be readily apparent from FIG. 4, during the first and second forward speeds the engine torque is transmitted from the input shaft I to ring gear R1 (viz., an element having a relatively large diameter) due to the engagement of clutch C2 and release of clutch C1. In third speed, clutches C1 and C2 are engaged. This splits the input torque between the ring gear R1 and the sun gear S1 and recombines same at the pinion carrier PC1 which in turns drives the output shaft 0 in a manner to establish a "direct drive". In fourth gear, clutches C1, C2 and band brake B1 are engaged while clutches C2 and C3 are released. Under these conditions, the ring gear R2 of the second planetary gear train G2 rotates at a speed greater than the input shaft I producing an "overdrive". However, even though the rotational speed of the ring gear R2 is, as previously mentioned higher than that of the input shaft, the rotational speed thereof is still relatively low. This will become clear hereinafter.

Referring now to the diagrams set forth in FIGS. 5 to 9, let it be assumed for the sake of explanation that the rotational speeds of the ring gears, pinion carriers and sun gears are Nr, Npc and Ns, respectively, the number of teeth of the ring gear/the number of teeth of corresponding sun gear is "$\alpha$" and the relationship between Nr, Npc and Ns is expressed by the following equation:

$$Nr + "\alpha" \times Ns - (1 - "\alpha") \times Npc = 0.$$

Let it be further assumed that the axes representing the rotational speeds of the ring gear R, pinion carrier PC and sun gear S are the R, PC and S axes and that the ratio of the distance between the R and PC axes and the PC and S axes is "$\alpha$" and that the coordinates of the points where a straight line intersects the three axes satisfies the above equation. It should be noted that where two planetary gear sets are combined, the axes of the ordinates of the respective corresponding elements overlay each other.

Figure 5:
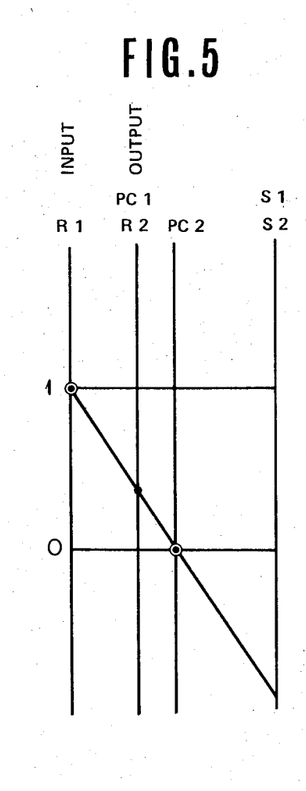
FIGS. 5 to 9 show in diagram form the various rotational speed relationships which develop within the gear train of the first embodiment during each of the four forward and one reverse speed ratios.

FIG. 5 shows the relationship which occurs in first speed. In this diagram the point "0" is located on the PC2 axis as this element is held stationary by brake B2 and the point "1" located on the R1 axis as the ring gear R1 is coupled with the input shaft I via clutch C2. Upon extrapolating a line which interconnects these points, an indication of the rotational speed of each element may be determined. In this gear or speed, the rotational speed of the output shaft is found on the PC1/R2 axis. As will be appreciated this rotational speed is lower than the that of the input shaft I and the input element R1.

Figure 6:
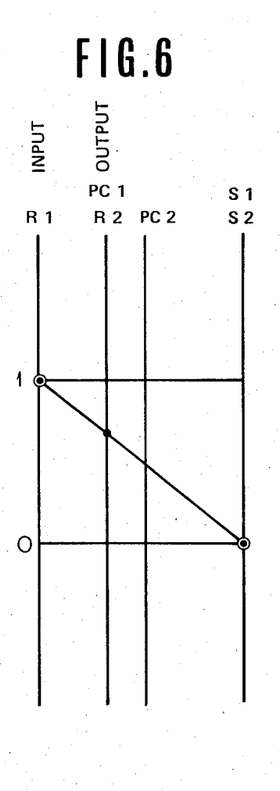
Figure 7:
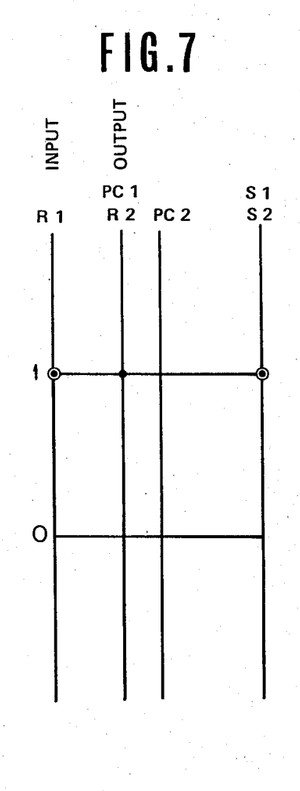

FIGS. 6 and 7 respectively show the diagrams for second and third speeds. As will be clear from these figures, still there is no element which rotates at a speed greater than that of the input shaft I.

Figure 8:
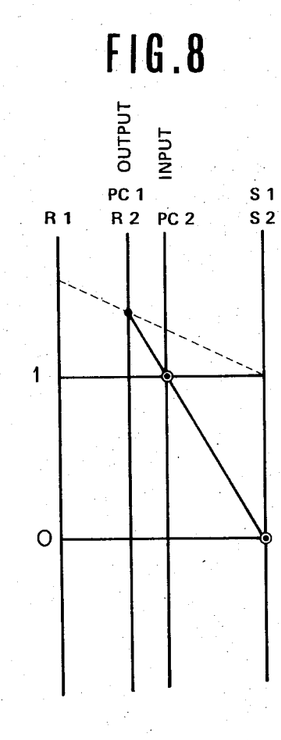

FIG. 8 shows the situation which occurs in fourth speed. As the gear train is producing an overdrive in fourth gear as previously mentioned, the rotational speed relationship indicated by the broken line occurs. That is to say, as the pinion carrier PC2 is connected with the input shaft I, the second ring gear R2 is connected with the output shaft O and the second sun gear S2 is held stationary, the ring gear R2 is rotated at a speed greater than the input shaft I. Further, in the first planetary gear set, as the sun gear S1 is connected with the input shaft I and the pinion carrier PC1 connected with the second ring gear R2, the first ring gear R1 rotates at a speed greater than that of the input shaft. However, as the rotational speed is only 1.5 times that of the input shaft speed the actual rotational speed of this element is not excessive.

Figure 9:
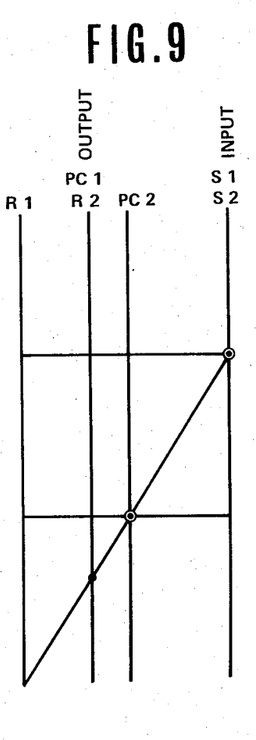

FIG. 9 shows the situation which occurs in reverse. It will be noted that in this case the torque is inputted through the first sun gear S1 due to the engagement of the first clutch C1, but as this is an infrequently used gear, the demerits associated therewith are deemed negligible.

It will be further appreciated that with the above disclosed embodiment a closed loop transmission path is not possible minimizing mechanical losses within the gear train.

Figure 10:
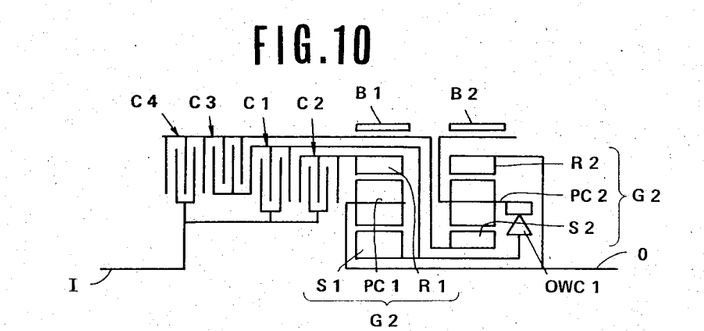
FIG. 10 is a schematic diagram of a second embodiment of the present invention.

FIG. 10 shows a second embodiment of the present invention. In this arrangement the input shaft I is selectively connectable with the first ring gear R1 of the first planetary gear set through the second clutch C2, and with the sun gear S1 via the first clutch C1. Pinion carrier PC1 is connected with the output shaft for synchronous rotation therewith as is ring gear R2. The sun gear S1 and the pinion carrier PC2 are operatively interconnected by a one-way clutch OWC1. The latter element (PC2) is connectable with the transmission housing through the second brake B2 while the sun gear S2 is (a) selectively connectable with the input shaft I through the fourth clutch C4, (b) connectable with the transmission housing H through brake B1 or (c) connectable with the first sun gear S1 through the third clutch C3.

Figure 11:
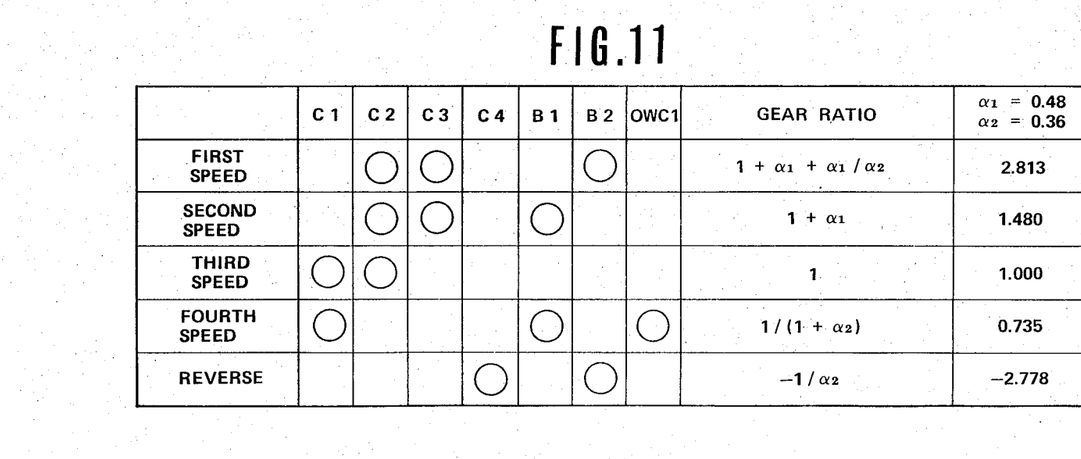
FIG. 11 is a table similar to that shown in FIG. 4 but showing the friction element engagements which produced the various gears produced by the second embodiment.

The operation of this embodiment will be clear from the clutch/brake "engagement" table of FIG. 11.

As the operation and effect provided by the second embodiment is essentially the same as that of the first embodiment a discussion of same will be omitted for the sake of brevity.

Figure 12:
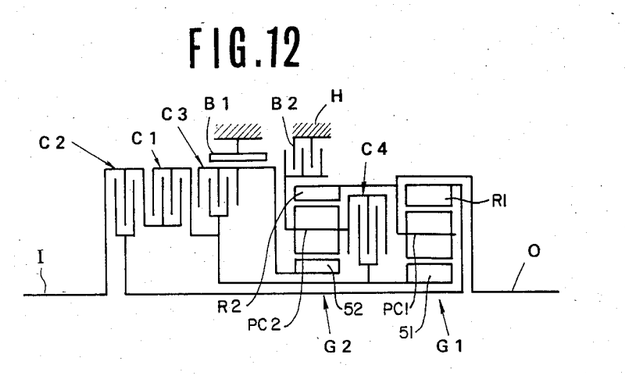

FIG. 12 shows a third embodiment of the present invention. In this arrangement the second planetary gear set G2 is disposed between the first set G1 and the input shaft I. Apart from this modification the interconnection and operation of the various elements comprising the device is essentially the same as that in the first embodiment shown in FIG. 3. Accordingly, further description will not be given.

Figure 13:
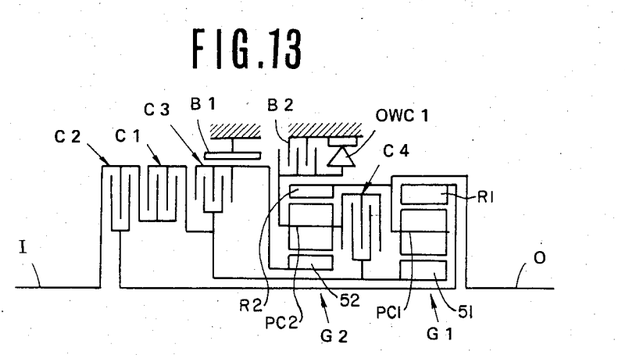

FIG. 13 shows a fourth embodiment of the present invention. This embodiment differs from that shown in FIG. 12 in that a one-way clutch OWC1 is included. This one-way clutch is disposed in parallel with the second brake B2 and arranged to prevent rotation of pinion carrier PC2 in one direction in a manner that when pinion carrier PC2 is driven from the input shaft I side, the one-way clutch eliminates the need for engaging the second brake B2 during D range operation. Accordingly, the control of the friction elements is simplifed.

Figure 14:
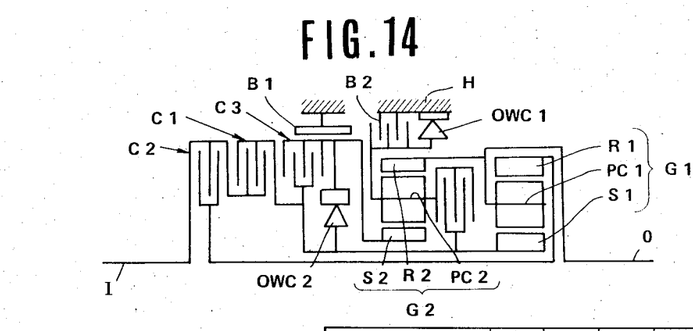

FIG. 14 shows a fifth embodiment of the present invention. This embodiment features the use of two one-way clutches OWC1, OWC2. The first (OWC1) is disposed as in the case of the embodiment shown in FIG. 13. The second is disposed in parallel with the third clutch C3. With this arrangement it becomes unnecessary to engage the third clutch C3 during D range operation. This of course facilitates shift timing control and a simplification of the hydraulic control circuit (not shown) via which each of the friction elements are controlled, as is also the case in the fourth embodiment. It is however possible to use only the second one-way clutch OWC2 as will be readily understood.

Figure 15:
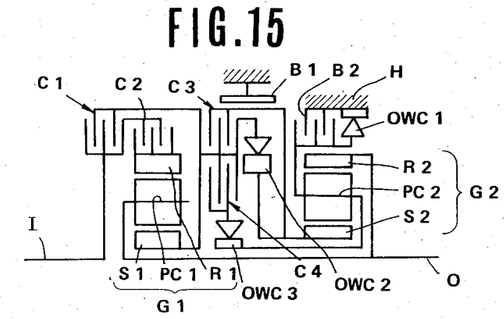
Figure 16:
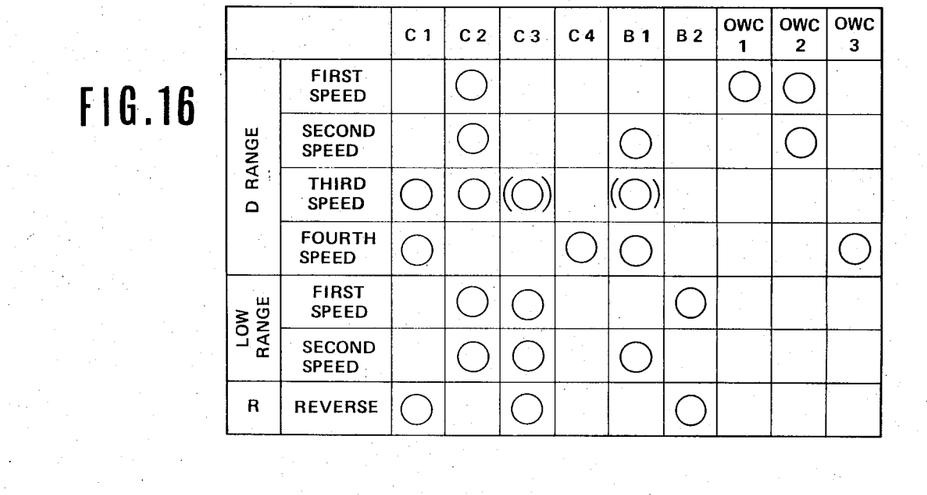
FIG. 16 shows a friction element engagement table illustrating the engagements which produce the various gear ratios of the sixth embodiment shown in FIG. 16.

FIG. 15 shows a sixth embodiment of the present invention. In this embodiment three one way clutches OWC1, OWC2 and OWC3 are used. The first and second of these clutches, OWC1, OWC2 are arranged similarly to that in the previously described embodiment (viz., the embodiment in FIG. 14). The third one-way clutch OWC3 is disposed between the fourth clutch C4 and the pinion carrier PC2. Accordingly, although the transmission of power from the side of the input shaft I is rendered possible during fourth speed, the third one-way clutch races when driven from the side of the output shaft O obstructing power transmission. This prevents engine braking and permits improved fuel economy. However, it should be noted that the first and second one-way clutches OWC1 and OWC2 may be omitted if so desired, the operation of the third being independent thereof. This point will be apparent from the engagement chart of FIG. 14.

Figure 17:
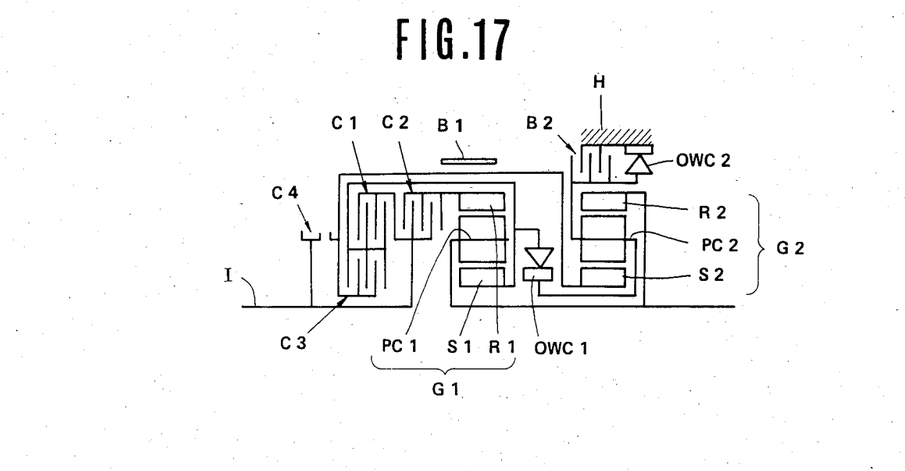
FIG. 17 shows schematically a seventh embodiment of the present invention.
Figure 18:
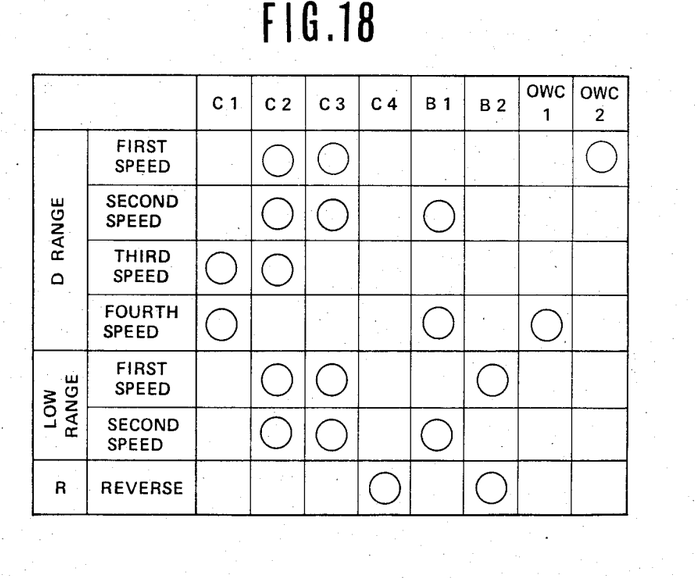
FIG. 18 shows the friction element "engagement" table for the seventh embodiment.

FIGS. 17 and 18 disclose a seventh embodiment of the present invention. This arrangement features the use of a single one-way clutch and a dog clutch as the fourth clutch C4. The one-way clutch OWC1 is disposed in parallel with the second brake B2 in a manner to render it unnecessary to engage the second barke B2 during forward D range transmission shifting. This of course aliviates some of the timing problems involved when shifting from first to second speed. As clear from the table of FIG. 18, the dog clutch is arranged to be involved in the production of the reverse gear only and therefore does not involve any shift timing considerations. The simiplification of the hydraulic control system possible with this arrangement will be readily apparent to those skilled in the art.

What is claimed is:
1. A planetary gear train transmission comprising:
an input shaft operatively connected with a source of rotational energy;
first and second planetary gear sets respectively including first and second sun gears, first and second ring gears, first and second pinion carriers and first and second sets of pinion gears operatively mounted on said first and second pinion carriers and respectively arranged to mesh with their respective sun and ring gears;
a first clutch selectively providing a drive connection between said input shaft and said first sun gear;
a second clutch selectively providing a drive connection between said input shaft and said first ring gear;
a third clutch selectively providing a drive connection between first and second sun gears;
a fourth clutch selectively providing a drive connection between said first sun gear and said second pinion carrier;
a first brake selectively rendering said second sun gear stationary with respect to a housing in which the transmission is disposed;
a second brake selectively rendering said second pinion carrier stationary with respect to said housing; and
an output shaft in drive connection with said first pinion carrier and said second ring gear, such that said transmission produces four forward speeds using only two planetary gear sets.

2. A transmission as claimed in claim 1 further comprising: a first one-way clutch disposed between said second pinion carrier and said transmission housing.

3. A transmission as claimed in claim 1, further comprising: a second one-way clutch disposed between said first sun gear and said second sun gear.

4. A transmission as claimed in claim 1, further comprising: a third one-way clutch disposed between said second carrier and said third clutch.

5. A transmission as claimed in claim 1, wherein said fourth clutch takes the form of a dog clutch.

6. In a transmission having only two planetary gear units:
an input shaft;
a first clutch connecting said input shaft with a sun gear of a first planetary gear unit of said two planetary gear units;
a second clutch selectively connecting said input shaft with a ring gear of said first planetary gear unit;
a third clutch selectively connecting the sun gear of said first planetary gear unit and a sun gear of a second planetary gear unit of said two planetary gear units;
a fourth clutch selectively connecting the sun gear of said first planetary gear unit with a pinion carrier of the second planetary gear unit;
a first brake selectively rendering the sun gear of said second planetary gear unit stationary with respect to a housing in which the transmission is disposed;
a second brake selectively rendering the pinion carrier of the second planetary gear unit stationary with respect to the housing; and
an output shaft connected to a pinion carrier of a first planetary gear unit and the ring gear of the second planetary gear unit, such that said transmission produces four forward speeds using only two planetary gear units.

* * * * *